FIG. 2a
FIG. 2b
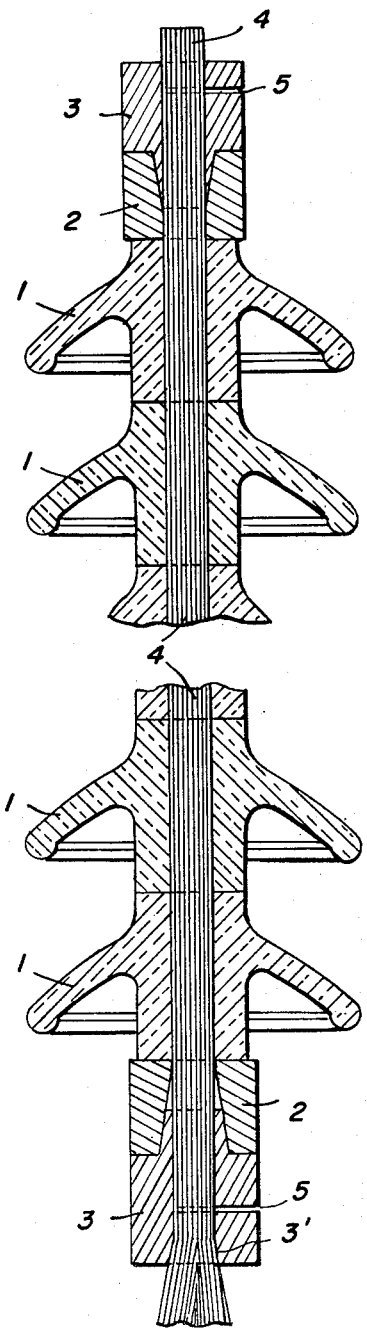
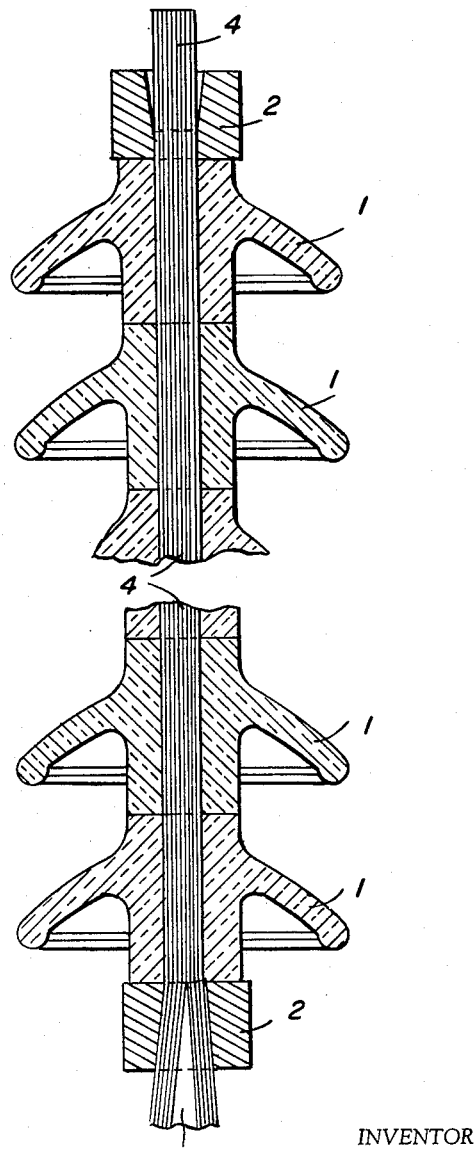
INVENTOR
KURT HOCKS

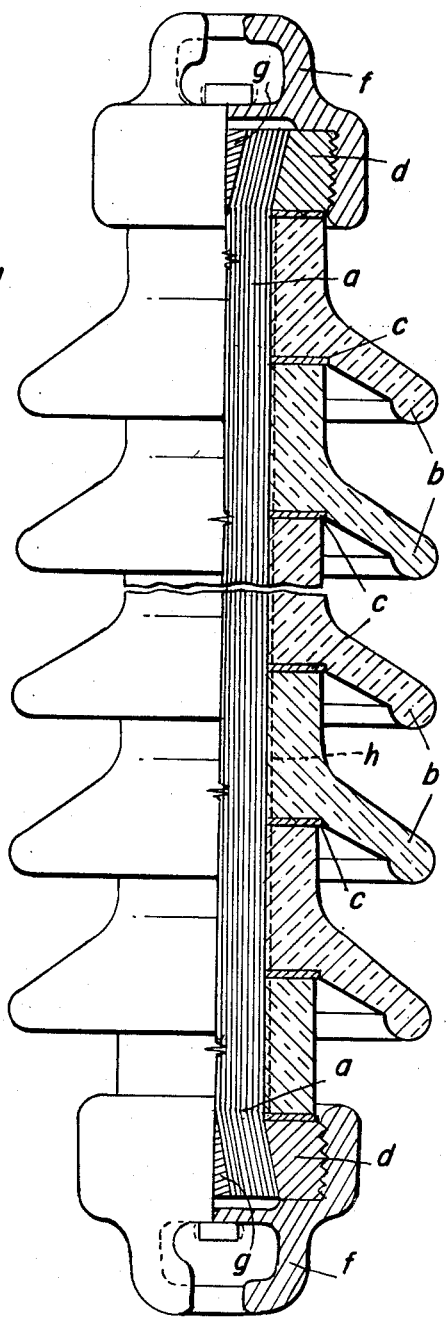

INVENTOR.
KURT HOCKS
ATTORNEY

May 26, 1964     K. HOCKS     3,134,164
MANUFACTURE OF SUSPENSION-TYPE LONG-BODY ELECTRICAL INSULATORS
Filed Jan. 29, 1958     5 Sheets-Sheet 4

INVENTOR.
KURT HOCKS
BY
ATTORNEY

May 26, 1964 K. HOCKS 3,134,164
MANUFACTURE OF SUSPENSION-TYPE LONG-BODY ELECTRICAL INSULATORS
Filed Jan. 29, 1958 5 Sheets-Sheet 5

INVENTOR
KURT HOCKS

BY *Albert L. Frey*
ATTORNEY

United States Patent Office 3,134,164
Patented May 26, 1964

3,134,164
MANUFACTURE OF SUSPENSION-TYPE LONG-BODY ELECTRICAL INSULATORS
Kurt Hocks, Aachen, Germany, assignor to Compagnie de Saint-Gobain, a corporation of France
Filed Jan. 29, 1958, Ser. No. 711,963
Claims priority, application France Mar. 7, 1956
13 Claims. (Cl. 29—155.52)

The present invention relates to improvements to the manufacturing processes for suspension-type elongate electrical insulators and has for its main object such an insulator showing improved mechanical and dielectric characteristics.

It has already been proposed to make such insulators as a hollow sleeve comprising certain number of piled rings, or petticoats, made of an insulating material such as tempered glass and a central core or support affording the shape of a rope, rod or tube of mineral fibres, preferably glass fibres, bonded by a hardenable plastic material or embedded in it. These insulators are much better than holder porcelain insulators. Their dielectric properties are equivalent and, moreover, their fibrous central support imparts to them a greater tensile, flexural, and torsional strength. Besides, tempered glass rings are much stronger against shock and compression then porcelain rings.

The main drawback in the manufacture of such insulators is the achievement of a sufficiently tight seal between the hollow sleeve and the fibrous central support which is an essential condition for preventing the penetration of moisture and the consequent current losses or discarding of the insulator.

Moreover, no industrial process enabled, up to now, to impart to the ends of the fibrous central support the optimum shape for the transmission of the mechanical stresses which it has to withstand.

The present invention has for its object a process for obviating these two difficulties, by achieving a perfectly tight and solid seal between sleeve and support and by imparting to both ends of said support the shape required to transmit the stresses which are encountered.

The process according to the invention consists first in making the hollow sleeve by piling up the required number of insulating rings and ultimately fitting at its both ends the metallic bushes provided with a conical boring opening towards the outside for mounting the insulator on the anchoring elements, secondly in introducing into said sleeve the central support while the impregnating material is still soft, thirdly in widening the ends of the central support so as to completely fill the conical bore of the end bushes, and fourthly to let said support set. It may be advantageous that the cross-sectional area of the support when in the soft state be slightly greater than that of the bore of the sleeve so that when the support is inserted into the sleeve, the excess plastic material will strip off or overflow, and the support will fit perfectly within the sleeve.

The seal between the sleeve and the support may be improved in several ways, such as by applying a compressive stress to the ends of the support to force back the plastic material towards the interior of the sleeve, and to maintain said stress up to the time of final setting of the plastic material. In accordance with the inventive process, the support protrudes beyond both ends of the sleeve and over metallic end bushes fitted at said ends so as to provide an excess of material for filling the bore of the sleeve when the ends of the support are compressed.

Another mode of improving the seal consists in using a tubular support formed by a resilient tube surrounded by a layer of plastic resin. The support is introduced into the sleeve in a plastic state and a gaseous pressure is applied to the interior of the tube which serves to press the external face of said tubular support against the internal face of the sleeve until the plastic resin is set. This phase of the manufacturing process may be followed by the introduction of a filler made of a plastic material, which may be reinforced with mineral fibers such as glass fibers, into the interior of the resilient tube. The plastic material on the interior of the resilient tube may be identical to the plastic resin between the exterior of the tube and the inner wall of the sleeve.

The widening of the support ends may be effected by introducing tapering metallic parts in said ends and along the axis of said support. The tapering metallic parts may be bored through with a longitudinal conduit for inflating gas into the tubular support, as mentioned above.

The insulator elements forming the sleeve may have the internal wall of their central bore provided with splines or grooves for increasing adherence and anchoring of the support when pressed against said internal wall during setting.

The invention also contemplates heating of the sleeve during the introduction of the support for keeping the impregnation material in the plastic state during the manufacturing process.

When the process according to the present invention is carried out, care must be taken that, on inserting the core of resin impregnated mineral fibres while said core is still in the plastic state, both ends of said core are uniformly impregnated, their shape is perfectly cylindrical, and all fibres are of equal length. When the ends of the core are widened or expanded, which, as already described, is best obtained by inserting a steel wedge, it is necessary to avoid driving back the parallel fibres of the core as this would reduce their mechanical strength.

This expansion of the ends of the core is accomplished by setting auxiliary bushes against the outer faces of the main bushes, placed at the ends of the insulating sleeve, before the insertion of the core of resin impregnated mineral fibres into the inner cavity of the sleeve. The inner diameter of these auxiliary bushes are equal or nearly equal to that of the inner cavity of the aforesaid sleeve. Also the auxiliary bushes make possible the cutting or severance of the ends of the inserted core into uniform desired lengths by means of saw-cuts arranged transversely in the auxiliary bushes, so that the ends may be fixed to the main bushes after removal of the auxiliary bushes.

According to one manner of carrying out this invention, the mineral fibres of the free and still soft ends of the core are, after removal of the auxiliary bushes, spread radially in equal distribution around the main bushes and then compressed and held in place by means of a crimping ring over a flange which projects from the insulating sleeve, or, better still, on the main bush on the outer face of said flange. The mineral fibres now filling the conical bore of the bush are then compressed against the wall of said bore by the already mentioned insertion of a conical wedge.

If necessary, the bores of the bushes placed at the ends of the insulating sleeve may be cylindrical, thus eliminating the use of compression wedges.

The invention also provides for making a suspension means in fixed relationship with the ends of the core of mineral fibres such as by passing said core through a tube and through the bore of a specially designed bush and fixing it to the latter by means of a flanged cap fitted on said bush.

Another way of fitting the insulator with such a suspension means is to insert into the conical bore of the bush a double cone fitted with a suspension means and surrounded by another bush with a reversed conical bore and provided with a flange, the fibres being passed between the outer surface of the double cone and the inner surface of the bushes and secured, by means of a crimping ring, to the flange of the end bush.

The action of the aforesaid crimping ring results in stretching the fibres of the core along the inner surface of the bushes but if they are to be stretched along the whole of their length a ring fitted with a circular projecting flange is used between the main bush (which, in this case, is not provided with a flange) and the auxiliary bush before the insertion of the core. In this case, the main bush is provided with an external thread on which is screwed a tightened nut. After removal of the auxiliary bush, the free end of the core is fixed to said ring by a crimping ring and the nut is turned to displace slightly the said ring along the axis of the core and consequently straighten the whole core which is then held firm in this state by insertion of a wedge. After completion of the polymerization the fixture can be removed and used again by slightly unscrewing the tightening nut and cutting the core by inserting a cutting instrument in the space between the main bush and the ring.

Further, the experience has shown that it is advantageous to reduce the mechanical stress withstood by the insulating sleeve and have said stress almost entirely borne by the central core of resin impregnated mineral fibres. This is best obtained by establishing a resilient bond between said core and said sleeve by insertion of a sheath of insulating and resilient material and filling of the space between said sheath and said sleeve with synthetic resin. The stress withstood by the sleeve is then reduced to a minimum and the size of the insulating rings or petticoats may be reduced accordingly, the only factor to be considered being then their electrical behaviour. In practice, a good standard will be to give the petticoat an outer diameter twice as large as the diameter of the hub. The latter size, upon which the resistance to fracture of the ring depends, may be reduced and consequently the size of the petticoat, which reduces the surface exposed to weathering.

This application is a continuation-in-part of my prior filed application filed March 5, 1957, Ser. No. 644,016, now abandoned.

In the annexed drawings, showing by way of example how the invention may be carried out:

FIG. 1 is a longitudinal section of a long body insulator according to the present invention;

FIG. 2a is a longitudinal section of a similar long-body insulator fitted with auxiliary bushes;

FIG. 2b shows the insulator of FIG. 2 after removal of the auxiliary bushes;

Figure 3:
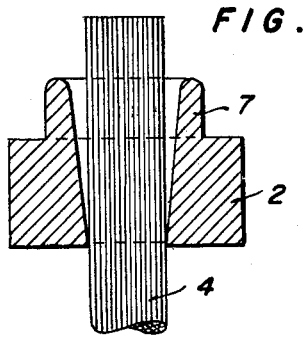
FIGS. 3, 4 and 5 show the folding back and fixing of a free end of the core of mineral fibres to a bush having a conical bore.

In the example shown in FIG. 1, the part designated by the letter $a$ is the support made of plastic material reinforced with mineral fibres, preferably glass fibres. Such fibres are preferably used in the form of elementary parallel threads, rovings, untwisted slivers of parallel individual fibres or even fabrics shaped into a rope, said fibres being bonded by a plastic material or embedded in it according to conventional processes. The volumetric percentage of the fibres may reach 80 to 90%. The plastic materials used may be thermoplastic or thermosetting resins of high electric resistivity. $b$ is the outer insulating sleeve made of superimposed elements, preferably of tempered glass, separated by joints $c$. These elements may have their internal surface grooved, as shown by vertical splines or grooves $h$ on the drawing. In the example illustrated, steel bushes $d$ are fitted at both ends of the insulating sleeve. These bushes are provided with an external threading on which are screwed the steel anchoring elements $f$ for suspending the insulator. The bore of the bushes is conical and flares towards the outside. The core or support $a$ is introduced into the external sleeve and bushes as has been previously described by exerting a pressure on the ends of the core and support and introducing conical wedges $g$.

In the example shown in FIG. 2a the insulating sleeve is formed by rings or petticoats 1 and its ends are provided with bushes 2 having a flared bore. Auxiliary bushes 3 each having an external frusto-conical projection conforming to the flared bore in bushes 2 and fitted with an internal cylindrical bore are placed adjacent to bushes 2. The insertion of the core of mineral fibres 4 is helped by a funnel-shaped enlargement 3' of the auxiliary bush fitted at the entry end of the sleeve. In the cylindrical bore of the auxiliary bushes, the core of mineral fibres preserves its regular form and its uniform impregnation. The cutting into predetermined and uniform lengths is carried out by means of saw-cuts 5 arranged in the auxiliary bushes 3. This operation is carried out without deformation of the core of mineral fibres. After removal of the auxiliary bushes it is possible, as already described, to insert into the free and still soft ends of the core a wedge which will compress the fibres against the conical bore of bushes 2.

Figure 4:
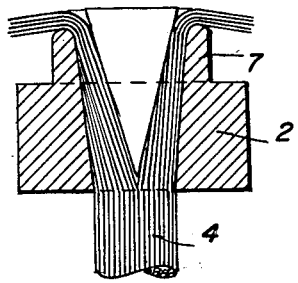
Figure 5:
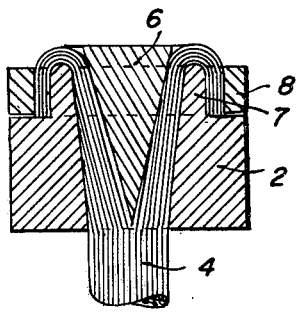

In the embodiment shown in FIGS. 3, 4 and 5, the driving back of the fibres, which might result from the insertion of the cone 6, is avoided. For this, the fibres of core 4 are distributed radially and folded back on a circular flange 7 of bush 2 and clamped by forced insertion of a crimping ring 8, between said ring and the outer wall of said flange. Thus, the fibres, with which the cone 6 inserted immediately afterwards comes into contact, are stretched and held in place in such a way that they can neither slip nor be driven back.

Figure 6:
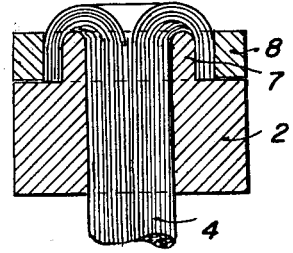
FIG. 6 shows similar operations in the case of a bush having a cylindrical bore.

In many cases, however, it is not necessary to fix the mineral fibres in the inner bore of bushes 2 and they are sufficiently held by the crimping rings 8 which compress the ends of the fibres against the outer wall of flange 7. In this case, the inner bore of bushes 2 is cylindrical, as shown in FIG. 6.

Figure 7:
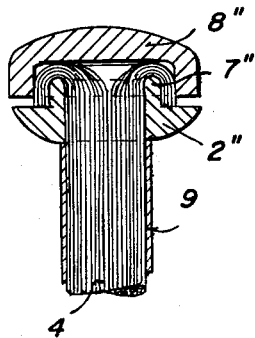
FIG. 7 shows the fitting of an end of the core of mineral fibres into a suspension means.

In the embodiment of FIG. 7 the core of mineral fibres 4 is passed, as it protrudes from the insulating sleeve, through a steel tube 9 and through the bore of a bush 2 placed on said tube, and on the circular flange 7' of which the free ends of the fibres are folded back and clamped by means of a crimping cap 8'. Parts 9 and 8' of this arrangement, together with the clamped end of the core, may constitute a suspension unit.

Figure 8:
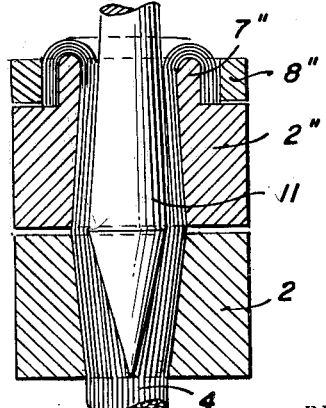
FIG. 8 shows the fixing of the end of the core in two superimposed bushes, in combination with a double cone, also forming a suspension means.

In the embodiment shown in FIG. 8 the lower part of a double cone 11, provided with suspension means 10 and the upper part of which is surrounded by a second bush 2" fitted with a flange 7", is forced into the conical bore of bush 2. The ends of the mineral fibres of core 4 are, as in the other examples, held in place by means of a crimping ring 8".

The manufacture of the insulator end shown in said FIG. 8 is as follows: a bush 2 is placed on the end of the insulating sleeve and an auxiliary bush 3 of suitable length is then placed on said bush 2 as shown on FIG. 2a. Once the core 4 has been passed through both bushes and cut to length in saw-cut 5 of auxiliary bush 3 (FIG. 2a), the latter is removed. The double cone 11 is then introduced into the end of the core in such a way that both axes of the double cone and the core coincide. Below part 10, said double-cone 11 is surrounded, but not shrunk, by bush 2″. Thus, the ends of the fibres are maintained around the double cone; bush 2″ is then driven on said fibre ends until it contracts bush 2 and the crimping ring 8″ and double cone 11 are driven in place by force.

Figure 9:
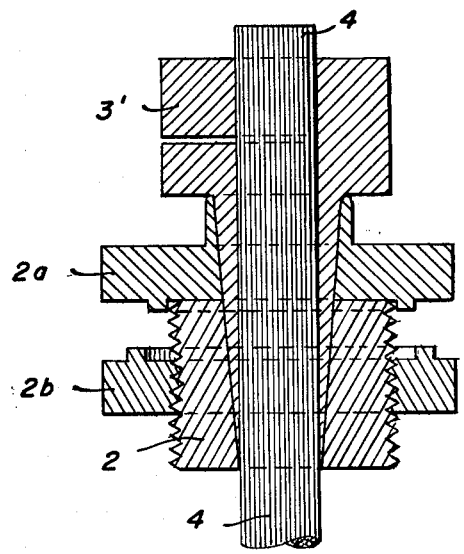
FIGS. 9 and 10 show the device for stretching the core of mineral fibres throughout its entire length.
Figure 10:
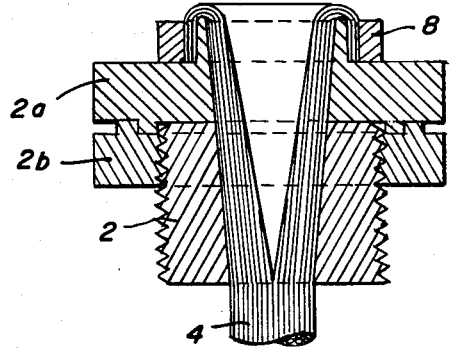

FIG. 9 shows a ring 2a inserted, in course of assembly, between the main bush 2 and the auxiliary bush 3′. It also shows a tightening nut 2b. Once the fibres have been fixed to ring 2a by means of crimping ring 8, the core is tightened by turning nut 2b (FIG. 10) and then the fibres are fixed in this state by introduction of the wedge.

Figure 11:
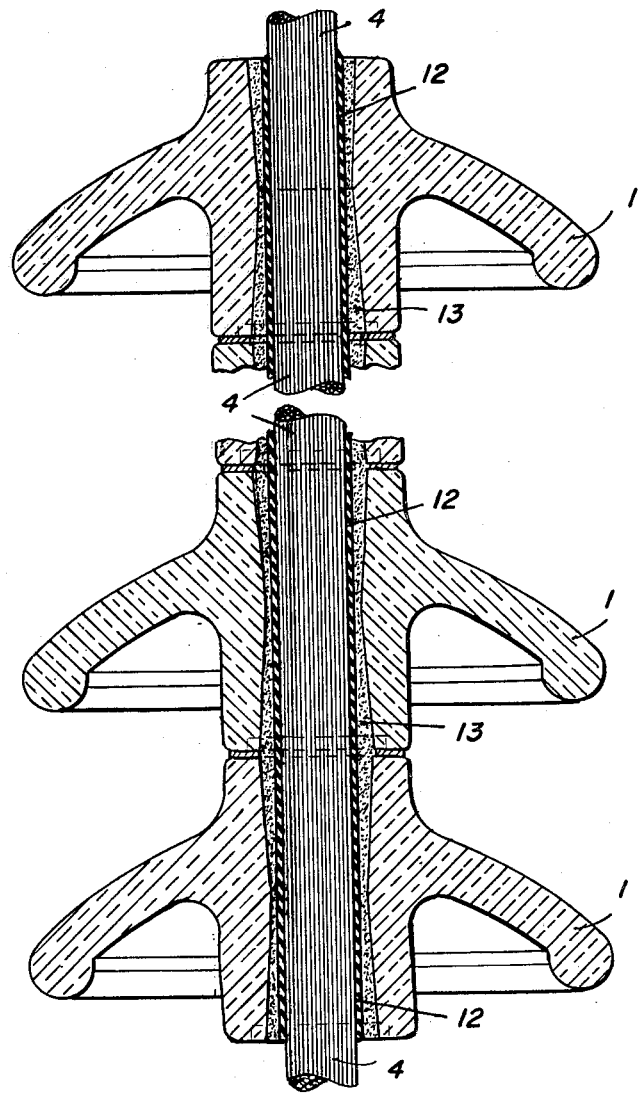
FIG. 11 is a longitudinal section of an insulator according to the invention but provided with means for establishing a resilient bond between the external insulating sleeve and the central core.

In the method illustrated in FIG. 11, a hollow tube 12 made of an insulating and resilient material such as rubber is introduced into the bore of the outer insulating sleeve 1. The space between the sleeve 1 and the tube 12 is filled with synthetic resin in the liquid state, to which a filler has been added in order to eliminate shrinkage upon polymerization. Upon completion of the polymerization a core or rod 4 is introduced into tube 12. Said core 4 is made of mineral fibres impregnated with a synthetic resin which polymerizes inside the insulator. As core 4 and resin fill up space 13 they get strongly bound to tube 12 although core 4 may elongate independently of tube 12 due to the resilience of said tube.

It must be understood that the present invention is not limited to the embodiments described and illustrated which have been chosen only by way of example. It must also be understood that the invention also applies to insulators made of other materials than glass such as porcelain or any other insulating material.

What is claimed is:

1. The method of manufacturing suspension-type elongate electrical insulators each formed of a rod-like supporting core of mineral fibers embedded in a plastic material and an external insulating sleeve of superimposed annular elements of insulating material, which comprises forming the insulating sleeve by confining a predetermined number of insulating elements between end members, inserting into said sleeve and end members the supporting core while its plastic constituent is still in a viscous but hardenable state, and expanding the ends of said core to apply pressure thereat and throughout the core as the same hardens into tight sealing engagement with the inner wall of said sleeve.

2. The method of manufacturing suspension-type elongate electrical insulators each formed of a rod-like supporting core of mineral fibers embedded in a plastic resin and an external insulating sleeve of superimposed annular elements of insulating material, which comprises forming the hollow insulating sleeve with a central opening therein by assembling a predetermined number of apertured insulating elements between opposed confining end members, forming a cylindrical core of mineral fibers and impregnating said core with a thermoplastic resin in a viscous but hardenable plastic state, inserting into said sleeve and end members said impregnated core of mineral fibers while said thermoplastic resin is maintained in said viscous but hardenable plastic state, securing the ends of said core to said end members, and permitting the resin to harden while the plastic-embedded fibers are compressed along the length of the core against the inner walls of said end members and sleeve.

3. The method set forth in claim 2 wherein the core of mineral fibers consists of glass fibers arranged in parallelism with the longitudinal axis of the elongate insulator.

4. The method set forth in claim 2 wherein the volumetric percentage of the mineral fibers in the core is 80% to 90% of the volume thereof.

5. The method set forth in claim 2 wherein the cross-sectional area of the supporting core is at least as great as that of the central opening in the hollow insulating sleeve.

6. The method set forth in claim 5 wherein the original cross-sectional area of the supporting core, before it is inserted into the sleeve, is slightly greater than that of the opening in the hollow insulating sleeve.

7. The method of manufacturing suspension-type elongate electrical insulators each formed of a rod-like supporting core of mineral fibers embedded in a plastic resin and an external insulating sleeve of superimposed annular elements of insulating material, which comprises forming the hollow insulating sleeve by assembling a predetermined number of insulating elements between opposed confining end members, forming a cylindrical core of mineral fibers and impregnating said core with a thermoplastic resin in a viscous but hardenable plastic state, inserting into said sleeve and end members said impregnated core of mineral fibers while said thermoplastic resin is maintained in said viscous but hardenable plastic state, and compressing the ends of the cylindrical core to transmit the compressive force to the exterior of said core and thereby to press the plastic-embedded fibers into tight contact with the inner walls of said end members and sleeve while the resin changes into a hardened state, and securing the ends of said core to said end members.

8. The method set forth in claim 7 wherein the compression of the ends of the cylindrical core is effected by forcing a conical wedge into the end members centrally of the cylindrical core of mineral fibers.

9. The method set forth in claim 7, including the step of heating the hollow insulating sleeve during the insertion of the core thereinto and the subsequent compression of the latter to maintain the core sufficiently fluid during said procedures.

10. The method of manufacturing suspension-type elongate electrical insulataors each formed of a rod-like supporting core of mineral fibers embedded in a plastic material and an external insulating sleeve of superimposed annular elements of insulating material, which comprises forming the hollow insulating sleeve by assembling a predetermined number of apertured insulating elements between opposed confining end members, forming a core of mineral fibers and impregnating said core with a thermoplastic resin in a viscous but hardenable plastic state, sheathing said core with a layer of resilient insulating material, inserting said sheathed core into said sleeve and end members, and compressing the ends of the fibers to force the supporting core and surrounding sheath into tight contact with the inner wall of the sleeve while the viscous resin hardens.

11. The method set forth in claim 10 wherein a space is provided between the inner wall of the sleeve and the outer wall of the sheathed core, which includes the step of filling said space with a fluid synthetic resin before compressing the ends of the fibers.

12. The method of manufacturing suspension-type elongate electrical insulators each formed of a rod-like supporting core of parallel disposed mineral fibers embedded in a hardened plastic resin and an external insulating sleeve of superimposed annular elements of insulating material, which comprises forming a hollow insulating sleeve by assembling a predetermined number of apertured insulating elements between opposed confining end members, forming a cylindrical core of mineral fibers and impregnating said core with a thermoplastic resin in a viscous but hardenable plastic state, inserting said core into said sleeve and end members, cutting the ends of said fibers to a common length, spreading the ends of the fibers uniformly in a circular periphery, and compressing the ends of the fibers to force the supporting core into tight contact with the inner wall of the sleeve while the viscous resin hardens.

13. The method of manufacturing suspension-type elongate electrical insulators each formed of a rod-like supporting core of mineral fibers embedded in a plastic material and an external insulating sleeve of superimposed annular elements of insulating material, which comprises forming an internally grooved insulating sleeve by confining a predetermined number of internally grooved insulating elements between end members with the grooves in alignment, inserting into said sleeve and end members the supporting core while its viscous but hardenable plastic constituent is still in a fluid state, and expanding the ends of said core to apply pressure thereto as the same hardens into tight sealing engagement with the grooved inner wall of said sleeve.

References Cited in the file of this patent

UNITED STATES PATENTS

| | | |
|---|---|---|
| 1,164,739 | Mershon | Dec. 21, 1915 |
| 1,699,063 | Hawley | Jan. 15, 1929 |
| 1,799,580 | Burke | Apr. 7, 1931 |
| 1,906,829 | Acly | May 2, 1933 |
| 2,405,425 | Higgins | Aug. 6, 1946 |
| 2,425,883 | Jackson | Aug. 19, 1947 |
| 2,602,766 | Francis | July 8, 1952 |
| 2,732,423 | Morrison | Jan. 24, 1956 |

FOREIGN PATENTS

| | | |
|---|---|---|
| 34,011 | Sweden | Oct. 25, 1911 |
| 629,322 | France | Nov. 8, 1927 |